United States Patent [19]
Idel et al.

[11] 4,174,437
[45] Nov. 13, 1979

[54] PROCESS FOR THE PREPARATION OF BRANCHED POLYCARBONATES

[75] Inventors: Karsten Idel; Dieter Freitag; Werner Nouvertne, all of Krefeld, Fed. Rep. of Germany

[73] Assignee: Bayer Aktiengesellschaft, Leverkusen, Fed. Rep. of Germany

[21] Appl. No.: 894,229

[22] Filed: Apr. 7, 1978

[30] Foreign Application Priority Data

Apr. 26, 1977 [DE] Fed. Rep. of Germany ....... 2718466

[51] Int. Cl.² ............................................. C08G 63/62
[52] U.S. Cl. .................................. 528/199; 528/172; 528/196; 528/198; 528/202; 528/203
[58] Field of Search ............ 260/47 XA, 77.5 D, 463, 260/49, 45.7 R, 45.85 H

[56] References Cited

U.S. PATENT DOCUMENTS

| | | | |
|---|---|---|---|
| 3,541,049 | 11/1970 | Cleveland | 260/47 XA |
| 4,001,183 | 1/1977 | Frietag | 260/47 XA |
| 4,059,565 | 11/1977 | Yoshizaki | 260/47 XA |
| 4,104,245 | 8/1978 | Mark | 260/823 |

*Primary Examiner*—Theodore E. Pertilla
*Attorney, Agent, or Firm*—Gene Harsh; Lawrence S. Pope

[57] ABSTRACT

The present invention relates to a process for the preparation of branched thermoplastic polycarbonates, characterized in that diphenols are completely reacted with about 0.05 to about 2.0 mol %, relative to mols of diphenols, of cyanuric chloride in a primary reaction, while controlling the pH and temperature and in the presence of a co-solvent, and thereafter the products are subjected to polycondensation, in accordance with known methods of the phase boundary process, to give high-molecular weight, branched polycarbonates. The invention further relates to the branched polycarbonates prepared by this process.

15 Claims, No Drawings

PROCESS FOR THE PREPARATION OF BRANCHED POLYCARBONATES

BACKGROUND OF THE INVENTION

U.S. Pat. No. 3,541,049 describes the co-use of cyanuric chloride in the preparation of thermoplastic, high-molecular weight polycarbonates.

However, the polycarbonates obtainable by this process for example have no stability towards heat, which leads to discoloration during the thermoplastic processing, and also have a reduced resistance towards the action of light, from which signs of yellowing of the material result.

According to German Patent Specification No. 2,246,106, priority case for U.S. Pat. No. 3,894,991, and German Patent Specification No. 2,346,935, priority case for U.S. Pat. No. 3957 728, the complete incorporation of trihalogeno-s-triazines into polycarbonates containing the s-triazine ring is carried out via primary reactions of the halogen atoms of the triazine ring with appropriate amounts of aromatic dihydroxy compounds and subsequent polycondensation of the products to give high-molecular weight polycarbonates by known polycarbonate preparation processes.

BRIEF SUMMARY OF THE INVENTION

The present invention relates to a process for the complete incorporation of cyanuric chloride into thermoplastic polycarbonates, which is characterized in that diphenols are completely reacted with about 0.05 to about 2.0 mol %, relative to mols of diphenols, of cyanuric chloride in a primary reaction, while controlling the pH and temperature and in the presence of a co-solvent, and thereafter the products are subjected to polycondensation, in accordance with known methods of the phase boundary process, to give high-molecular weight, branched, thermoplastic polycarbonates.

The polycarbonates obtainable according to the invention have, compared with those of U.S. Pat. No. 3,541,049, an improved stability towards heat, which becomes evident, in particular, after severe heat exposure due to multiple extrusion.

Multiple extrusion without browning of the material is particularly important when processing thermoplastic polycarbonates, in particular by the blow-molding process, because the scrap obtained here can be recycled to the processing operation.

In addition to the already known pattern of properties of the polycarbonates obtainable according to the invention, which are dvantageous compared with linear polycarbonates (compare Example 3 infra), outstanding flame resistance, which attains the evaluation VO according to the burning test Subject 94 of Underwriters' Laboratories (U.S.A.), even with very thin wall thicknesses of 1/16 inch, is achieved with the polycarbonates of the present invention in combination with salts which are soluble or insoluble in the polycarbonate; in particular alkali metal salts of inorganic mineral acids and/or organic carboxylic acids and sulphonic acids in amounts of about 0.001 to about 0.5% by weight, relative to the weight of branched polycarbonate are preferred.

DETAILED DESCRIPTION OF THE INVENTION

According to the process of the present invention, about 0.05 to about 2.0 mol % of cyanuric chloride, dissolved in a solvent which is inert towards phosgene and is water-miscible, such as, for example, acetone or acetonitrile, are slowly metered into a mixture of 100 mol % of the halogen-free and/or halogen-containing diphenols and 25–200 mol %, preferably 100–200 mol %, of sodium hydroxide, or an equivalent amount of another appropriate base, in water over a period of about 0.2–5 hours at temperatures of about 0°–40° C. Complete reaction of the cyanuric chloride is effected at temperatures of about 0°–90° C., preferably about 20°–50° C., the temperature usually being slowly increased in order to ensure stepwise reaction of the individual chlorine atoms on the cyanuric chloride. However, the reaction can also be brought to completion at a constant temperature, in particular room temperature. The time of the complete reaction varies, depending on the temperature program chosen, from about 1–24 hours, in particular about 1–5 hours, the longer residence times being chosen for lower temperature ranges. After the reaction has ended, the polycarbonate can be prepared directly in the same reaction vessel by adding a solvent which is not water-miscible and is inert towards phosgene, such as, for example, methylene chloride, chlorobenzene or mixtures thereof, and an aromatic monohydroxy compound having an action as a chain-stopper, such as, for example, phenol, p-cresol, p-tert.-butylphenol or tribromophenol, in amounts of about 0.1 to about 8.0 mol %, relative to mols of the diphenols employed, and adjusting the pH to a suitable value, preferably about 12 to about 14, and phosgenating in accordance with the known phase boundary process. (A specific procedure for adding a "branching agent" which in this case may be construed as a diphenol-cyanuric chloride adduct to polycarbonate synthesis is set forth in U.S. Pat. No. Re. 27,682 incorporated herein by reference). The water-miscible co-solvent added during the conversion of cyanuric chloride in the primary reaction does not interfere with the phosgenation and the subsequent reaction steps. After condensation of the phosgenation mixture, according to known processes, by adding tertiary amines and after working-up of the batch, also according to known processes (see U.S. Pat. No. 3,028,365), the branched, high-molecular, thermoplastic and aromatic polycarbonates according to the invention are isolated. The water-miscible co-solvent from the primary reaction is almost quantitatively removed from the polycarbonate solution during the working-up process. After precipitating the polycarbonate and drying, or evaporating off the solvent, the polycarbonates according to the invention are obtained in a pure form.

By thermoplastic polycarbonates in the sense of this invention are understood aromatic homopolycarbonates and aromatic copolycarbonates, which are based, for example, on one or more of the following diphenols: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl)ethers, bis-(hydroxyphenyl) ketones, bis-(hydroxyphenyl) sulphoxides, bis-(hydroxyphenyl) sulphones or $\alpha,\alpha'$-bis-(hydroxyphenyl)-diisopropylbenzenes, and their nuclear-alkylated and nuclear-halogenated compounds. These and further suitable diphenols, as well as their preparation and working-up into high-molecular weight thermoplastic polycarbonates, are described, for example, in U.S. Pat. Nos. 3,028,365; 2,999,835; 3,148,172; 3,271,368; 2,991,273;

3,271,367; 3,280,078; 3,014,891 and 2,999,846, in German Published Specifications Nos. 1,570,703; 2,063,050; 2,063,052; 2,211,956 and 2,311,957, French Patent Specification No. 1,561,518 and in the monograph "H. Schnell, Chemistry and Physics of Polycarbonates, Interscience Publishers, New York, 1964".

Preferred diphenols are, for example: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred diphenols are, for example: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those which are based on one or more of the diphenols mentioned as preferred. Copolycarbonates which are based on 2,2-bis-(4-hydroxyphenyl)-propane and one of the other diphenols mentioned as particularly preferred are particularly preferred. Furthermore, polycarbonates based on 2,2-bis-(4-hydroxyphenyl)-propane or 2,2-bis-(3,5-dimethyl-4-hydroxyphenyl)-propane alone are particularly preferred.

As a rule, the aromatic polycarbonates should have mean weight-average molecular weights $M_\eta$ of 10,000 to over 200,000, preferably of 20,000 to 80,000, determined by measuring the relative viscosity in $CH_2Cl_2$ at 25° C. at a concentration of 0.5% by weight, and melt viscosities of $10^4$ to $10^2$ Pas (measured in Pascal×seconds=Pas at 300° C.) at deformation rates of $10°-5\times10^3$ second$^{-1}$.

In addition to phosgene, other carbonyl halides, such as, for example, carbonyl fluoride and carbonyl bromide and mixtures thereof, or bis-halogenocarbonic acid esters of dihdyroxy compounds, such as, for example, hydroquinone-bis-chlorocarbonic acid esters, can be used as carbonate-forming compounds in the phase boundary condensation.

As is customary, in the process according to the invention additives of all types can also be added during or after the preparation procedure. In this connection, there may be mentioned, for example, dyestuffs, pigments, mold-release agents, stabilizers towards the action of moisture, heat and UV light, lubricants, fillers, such as glass powder, quartz products, graphite molybdenum sulphide, metal powders, powders of higher-melting plastics, for example polytetrafluoroethylene powder, natural fibers, such as asbestos, and furthermore glass fibers of the most diverse nature, metal filaments and fibers which are stable while the polycarbonates remain in the melt and which are not noticeably harmful to the polycarbonates.

Apart from the addition of salts, as previously mentioned, the flame resistance of the branched polycarbonates obtainable according to the invention can also be achieved by the co-condensation of from about 5 to about 10 mol %, relative to mols of diphenol employed, of halogenated diphenols, in particular tetrabromobisphenol A.

The polycarbonates obtainable according to the invention are suitable both for extrusion and for injection-molding processing. Because of the good stability of the extruded material, it is also possible to produce large hollow articles by the blow-molding process. The excellent structural viscosity properties make it possible to obtain, in a readily accessible manner, for example, extruded films having good mechanical properties and reduced stress cracking.

Molded articles, such as moldings of all types, such as casings, bobbins, coverings, household utensils and the like can be produced by injection-molding.

Unless otherwise indicated, the contents in percent given in the examples relate to the weight. The relative viscosities $\eta_{rel}$ were measured on 0.5 percent strength solutions in methylene chloride at 25° C. The apparent melt viscosities, measured in Pascal×seconds (=Pas) at the particular deformation rate indicated (second$^{-1}$), were determined at 300° C. Further details can be seen in the examples.

EXAMPLE 1

2.28 kg of bisphenol A are initially introduced into a mixture of 200 g of sodium hydroxide in 1.1 l of water and 800 ml of acetonitrile. A solution of 18.44 g of cyanuric chloride (1.0 mol % of branching agent, relative to the proportion of bisphenol A) in 200 ml of acetonitrile is added dropwise at 15° C. in the course of 15 minutes. Thereafter, the reaction mixture is allowed to warm to room temperature in the course of 45 minutes and is then kept at 30° C. for 1 hour and subsequently at 40° C. for 1 hour. A solution of 20 l of water and 1.1 kg of sodium hydroxide and 25 kg of methylene chloride, as well as 61.5 g of p-tert.-butylphenol as a chainstopper, is then added to this pre-condensate and phosgenation is carried out in the customary manner by the phase boundary process by passing in 1.5 kg of phosgene in the course of 1 hour. 6 ml of triethylamine are then added and a condensation reaction is carried out for 1 hour.

The organic phase is separated off and washed twice with 2% strength phosphoric acid and three times, or until the aqueous phase is free from electrolytes, with water. The solvent is distilled off and 4.3 kg of a polycarbonate are obtained with a relative viscosity: $\eta_{rel}=1.320$.

The molecular weight measurements via the viscosity ($M_\eta$) and via light scattering ($M_{LS}$) give the following values:

$M_\eta=32,600$ $M_{LS}=41,800$

EXAMPLE 2

2.28 kg of bisphenol A are initially introduced into a solution of 1.4 kg of sodium hydroxide in 20 l of water, and 20 l of methylene chloride, as well as 61.5 g of p-tert.-butylphenol as a chain-stopper, are metered in. During the phosgenation with 1.5 kg of phosgene, which lasts one hour, a solution of 18.44 g of cyanuric chloride (1.0 mol % relative to the proportion of bisphenol A) in 2 l of chlorobenzene is added dropwise. After subjecting the reaction mixture to a condensation reaction for 1 hour by adding 6 ml of triethylamine, it is worked up as in Example 1.

$\eta_{rel} = 1.301$ $M_\eta = 30,700$ $M_{LS} = 36,900$

EXAMPLE 3

For comparison, a linear polycarbonate is prepared under the same conditions. The polycarbonate is prepared according to Example 2, but with the exception that no branching agent solution (cyanuric chloride in chlorobenzene) is added dropwise during the phosgenation.

$\eta_{rel} = 1.252$ $M_\eta = 25,400$ $M_{LS} = 25,600$

The difference between the molecular weight $M_\eta$ and $M_{LS}$ illustrates the action of the branching agent and the degree of the branching. While $M_\eta$ and $M_{LS}$ are almost identical in the case of the unbranched polycarbonate prepared in Example 3, the branched polycarbonates have a characteristic difference between $M_\eta$ and $M_{LS}$. Compared with Example 2, the polycarbonate in Example 1, which was prepared by the precondensation process according to the invention, exhibits a significantly greater difference between $M_\eta$ and $M_{LS}$ and accordingly also a higher degree of branching than the polycarbonate which was branched with cyanuric chloride according to the prior art.

EXAMPLE 4

In order to illustrate the pronounced structural viscosity of the branched polycarbonates according to the invention, the dependence of the apparent melt viscosity on the shear rate at 300° C. was determined for the polycarbonates prepared in Examples 1, 2 and 3 (die L/D 20):

| Shear rate (second$^{-1}$) | | 2 | $10^1$ | $5 \times 10^1$ | $10^2$ | $5 \times 10^2$ | $10^3$ |
|---|---|---|---|---|---|---|---|
| apparent rate of melting (Pas = Pascal×seconds) Polycarbonate according to Example | 1 | 4,100 | 3,800 | 2,050 | 1,400 | 650 | 420 |
| | 2 | 1,900 | 1,700 | 1,300 | 1,050 | 550 | 390 |
| | 3 | 390 | 390 | 380 | 370 | 340 | 275 |

The polycarbonate according to the invention also has here the most pronounced structural viscosity and thus also the highest degree of branching.

EXAMPLE 5

3.03 kg of bisphenol A are initially introduced into a mixture of 266 g of sodium hydroxide in 1.46 l of water and 1.0 l of acetonitrile. A solution of 12.97 g of cyanuric chloride (0.5 mol % relative to all the bisphenol constituents) in 265 ml of acetonitrile is added dropwise at 15° C. in the course of 15 minutes. Thereafter, the reaction mixture is allowed to warm to room temperature in the course of 45 minutes and is then kept at 30° C. for 1 hour and subsequently at 40° C. for 1 hour.

This pre-condensate is then dissolved in a solution of 25 kg of water, 1 g of sodium borohydride and 2,000 g of 45% strength sodium hydroxide solution, and 67.6 g of p-tert.-butylphenol in 34.8 kg of methylene chloride are added.

2.070 kg of phosgene are passed in in the course of one hour at 25° C., while stirring vigorously, and thereafter a solution of 427 g of tetrabromobisphenol A in 2.4 kg of 6.2% strength sodium hydroxide solution is added. The pH value of the reaction solution should be kept at 10-11 during this addition. After adding 60 ml of triethylamine, the mixture is subsequently allowed to react for an additional hour. The organic phase is separated off and washed twice with 2% strength phosphoric acid and three times, or until no further electrolyte can be detected, with water. After concentrating the organic phase, 3.75 kg of a bromine-containing polycarbonate (bromine content 5.8% by weight) with a relative viscosity $\eta_{rel} = 1.289$ are isolated.

According to the burning test of Underwriters' Laboratories UL Subject 94, the polycarbonate exhibits, with V0, the best evaluation, even at sheet thicknesses of 1/16 inch (no dripping of burning particles, after-burning times <5 seconds).

A corresponding unbranched polycarbonate with the same co-condensed proportion of tetrabromobisphenol A is, with the evaluation V 2 (after-burning times <25 seconds, dripping of burning particles) in a significantly poorer burning class.

EXAMPLE 6

2.28 kg of bisphenol A are initially introduced into a mixture of 200 g of sodium hydroxide in 1.1 l of water and 600 ml of acetonitrile. A solution of 9.22 g of cyanuric chloride (0.5 mol % of branching agent relative to the proportion of bisphenol A) in 100 ml of acetonitrile is added dropwise at 15° C. in the course of 15 minutes. Thereafter, the mixture is allowed to come to room temperature in the course of 45 minutes and then warmed at 30° C. for 1 hour and at 40° C. for a further 1 hour. A solution of 20 l of water and 1.1 kg of sodium hydroxide and 25 kg of methylene chloride, as well as 54.0 g of p-tert.-butylphenol as a chain-stopper, is added to this pre-condensate and phosgenation is carried out in the customary manner according to Example 1 by passing in 1.5 kg of phosgene in the course of 1 hour. Thereafter, a condensation reaction is carried out by adding 6 ml of triethylamine. After customary working up, a branched polycarbonate is obtained with a relative solution viscosity $\eta_{rel}$ 1.329.

In order to test the resistance to heat, this polycarbonate is subjected to a multiple extrusion, and after each extrusion operation the color number of the material is then determined by the following method:

The measurements of the prepared solution were carried out in a 5 cm thick cell in a Hardy spectrograph using monochromatic illumination of the sample in type C standard light (polycarbonate-free methylene chloride is used in the comparison irradiation operation). The concentration chosen corresponds to a sheet thickness of 2.0 mm.

| Number of extrusions: | 1 | 2 | 3 | 4 | 5 |
|---|---|---|---|---|---|
| Color number: | 0.31 | 0.34 | 0.38 | 0.41 | 0.46 |

EXAMPLE 7

2.28 kg of bisphenol A are initially introduced into a solution of 1.4 kg of sodium hydroxide in 20 l of water, and 20 l of methylene chloride, as well as 54 g of p-tert.-butylphenol as a chain-stopper, are metered in. During phosgenation with 1.5 kg of phosgene, which lasts one hour, a solution of 9.22 g of cyanuric chloride (0.5 mol %, relative to the proportions of bisphenol A) in 2 l of chlorobenzene is added dropwise. After subjecting the mixture to a condensation reaction for 1 hour by adding 6 ml of triethylamine, it is further reacted according to Example 2.

$\eta_{rel}$: 1.312.

The color number in the case of multiple extrusion is determined analogously to Example 6:

| Number of extrusion: | 1 | 2 | 3 | 4 | 5 |
|---|---|---|---|---|---|
| Color number: | 0.39 | 0.45 | 0.52 | 0.60 | 0.71 |

Compared with the color numbers of the polycarbonate, according to the invention, prepared according to Example 6, the polycarbonate branched with cyanuric chloride according to the prior art exhibits a significantly lower stability to heat, probably because of the incomplete incorporation of the branching agent.

EXAMPLE 8

0.1% by weight of potassium perfluorobutanesulphonate (% by weight, relative to the weight of polycarbonate) is incorporated into a branched polycarbonate, prepared according to Example 6, containing 0.5 mol % of cyanuric chloride via an extrusion operation. The polycarbonate was subjected to the burning test Subject 94 of Underwriters' Laboratories USA and receives, with VO, the best evaluation, even with very thin wall thicknesses of the test pieces of 1/16 inch (no dripping of burning particles, after-burning time <5 seconds).

Without the addition of 0.1% by weight of potassium perfluorobutanesulphonate, the polycarbonate according to Example 6 no longer receives a classification in the burning test Subject 94, since the after-burning times were over 30 seconds.

Although the invention has been described in considerable detail in the foregoing, such detail is solely for the purpose of illustration. Variations may be made by those skilled in the art without departing from the spirit and scope of the invention.

What is claimed is:

1. Process for the preparation of branched thermoplastic polycarbonates, characterized in that diphenols are completely reacted with about 0.05 to about 2.0 mol %, relative to mols of diphenols, of cyanuric chloride in a primary reaction, while controlling the pH and temperature and in the presence of a water miscible co-solvent, and thereafter the products are subjected to polycondensation, in accordance with known methods of the phase boundary process, to give high-molecular weight, branched polycarbonates.

2. A process for the preparation of branched thermoplastic polycarbonates comprising
   (a) completely reacting
      (1) about 0.5 to about 2.0 mol % of cyanuric chloride, dissolved in a water-miscible solvent, with
      (2) a mixture of a diphenol and a base in water and
   (b) subjecting the product obtained from (a) to polycondensation in accordance with the phase boundary process.

3. The process of claim 2, wherein the cyanuric chloride is dissolved in a solvent selected from the group consisting of acetone and acetonitrile.

4. The process of claim 2, wherein the diphenols contain from about 5 to about 10 mol % of halogen.

5. The process of claim 4, wherein the halogenated diphenol is tetrabromobisphenol A.

6. The process of claim 2, further comprising the addition of about 0.001 to about 0.5% by weight, relative to the weight of the branched polycarbonate, of an alkali metal salt of an inorganic mineral acid and/or organic carboxylic or sulphonic acid.

7. The process of claim 2, wherein the base of the diphenol-base mixture is present in an amount of about 25 to about 200 mol %.

8. The process of claim 7, wherein the base is NaOH.

9. In the process of synthesizing branched thermoplastic polycarbonates by way of the phase boundary method using cyanuric chloride as the trifunctional branching agent, the improvement comprising reacting between about 0.05 and 2.0 mol %, based on the mols of diphenol, of cyanuric chloride, dissolved in a water-miscible solvent, with the diphenols in a primary reaction.

10. A process for the preparation of branched thermoplastic polycarbonates comprising
    (a) completely reacting in the same reaction vessel over a period of about 1 to about 24 hours at temperatures of about 0° to about 90° C.
       (1) about 0.5 to about 2.0 mol % of cyanuric chloride, dissolved in a water-miscible solvent, with
       (2) a mixture of a diphenol and a base in water, and
    (b) subjecting the products obtained from
       (a) to polycondensation in accordance with the phase boundary process.

11. The process of claim 10, wherein the cyanuric chloride is slowly metered into the diphenol-base mixture.

12. The process of claim 10, wherein the temperature is constant.

13. The process of claim 10, wherein the temperature is slowly increased.

14. The process of claim 10, wherein the reaction takes place over a period of about 1 to about 5 hours at temperatures between about 20° and 50° C.

15. The process of claim 10, wherein polycondensation occurs in the presence of about 0.1—to about 8 mol % of a chain-stopper.

* * * * *